(12) United States Patent
Kannan et al.

(10) Patent No.: US 8,417,651 B2
(45) Date of Patent: Apr. 9, 2013

(54) MATCHING OFFERS TO KNOWN PRODUCTS

(75) Inventors: Anitha Kannan, Mountain View, CA (US); Inmar-Ella Givoni, Toronto (CA)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 12/783,753

(22) Filed: May 20, 2010

(65) Prior Publication Data

US 2011/0289026 A1    Nov. 24, 2011

(51) Int. Cl.
G06F 15/18    (2006.01)
(52) U.S. Cl. .......................................... 706/12
(58) Field of Classification Search ............. 706/12
See application file for complete search history.

(56) References Cited

U.S. PATENT DOCUMENTS

| | | | |
|---|---|---|---|
| 6,574,616 B1 * | 6/2003 | Saghir | 382/305 |
| 6,711,585 B1 * | 3/2004 | Copperman et al. | 1/1 |
| 7,302,429 B1 | 11/2007 | Wanker | |
| 7,349,868 B2 | 3/2008 | Tenorio | |
| 7,383,254 B2 * | 6/2008 | Wen et al. | 1/1 |
| 7,401,087 B2 * | 7/2008 | Copperman et al. | 707/737 |
| 7,562,088 B2 * | 7/2009 | Daga et al. | 1/1 |
| 7,693,306 B2 * | 4/2010 | Huber | 382/115 |
| 7,729,531 B2 * | 6/2010 | Winn et al. | 382/155 |
| 7,818,317 B1 * | 10/2010 | Emigh et al. | 707/724 |
| 8,046,681 B2 * | 10/2011 | Vydiswaran et al. | 715/234 |
| 8,180,755 B2 * | 5/2012 | Dalvi et al. | 707/706 |
| 2006/0080274 A1 | 4/2006 | Mourad | |
| 2007/0043651 A1 | 2/2007 | Xiao et al. | |
| 2007/0156678 A1 | 7/2007 | Ashkenazi et al. | |
| 2009/0063294 A1 | 3/2009 | Hoekstra et al. | |
| 2009/0198594 A1 | 8/2009 | Lu et al. | |

FOREIGN PATENT DOCUMENTS

WO    WO-2006080274 A1    8/2006

OTHER PUBLICATIONS

Liu et al., "An XML-Enabled Data Extraction Toolkit for Web Sources," Elsevier Science Ltd., 2001, http://cmapspublic3.ihmc.us/rid=1228288297429_1842851864_16163/An%20XML%20enabled%20data%20extraction%20toolkit.pdf.
Ding et al., "GoldenBullet: Automated Classification of Product Data in E-commerce," Business Information Systems, 2002, http://www.procurebot.com/knowledge_base/bibliography/goldenbullet.bis2002.pdf.

* cited by examiner

*Primary Examiner* — Michael B Holmes
(74) *Attorney, Agent, or Firm* — Microsoft Corporation

(57) ABSTRACT

A method and apparatus for electronically matching an electronic offer to structured data for a product offering is disclosed. The structure data is reviewed and a dictionary of terms for each attribute from the structure data is created. Attributes in unstructured text may be determined. Each pair of the attributes (name and value) from the unstructured data and the structured data are obtained, the attribute pairs of the structured data and the unstructured data and compared and a similarity level is calculated for the matching the attribute pairs. The structured data pair that has the highest similarity score to the unstructured data pair is selected and returned.

20 Claims, 5 Drawing Sheets

Structured Record (Product) — 300

| Attribute Name | Attribute Value |
| --- | --- |
| Category | Digital camera |
| Brand | Panasonic |
| Product Line | Panasonic Lumix |
| Model | DMC-FX07 |
| Sensor Resolution | 7 Megapixel |
| Colour | Silver |
| Weight | 132 g |
| Width | 9.4 cm |
| Height | 5.1 cm |
| Depth | 2.4 cm |
| Display (Projector) / Type | LCD display |
| Display (Projector) / Technology | TFT active matrix |
| Display (Projector) / Diagonal Size | 2.5 in |
| Audio Input / Type | None |
| Flash Memory / Form Factor | Memory Stick |
| Flash Memory / Storage Capacity | 8 MB |
| Video Input / Still Image Format | JPEG |
| Video Input / Digital Video Format | MPEG-1 |
| Lens System / Optical Zoom | 3.6 |
| ... | |

Unstructured Text (Offer-1)

Panasonic Lumix DMC-FX07 Digital Camera [7.2 megapixel, 2.5", 3.6x Optical Zoom, LCD Monitor ]

Unstructured Text (Offer-2)

Panasonic DMC-FX07EB Digital Camera Silver

Unstructured Text (Offer-3)

Lumix FX07EB-S, 7.2 MP

MATCHING OFFERS TO KNOWN PRODUCTS

BACKGROUND

This Background is intended to provide the basic context of this patent application and it is not intended to describe a specific problem to be solved.

Vendors usually desire to have their goods available and easily located on the Internet. However, submitting offers to aggregator and search sites is not a simple task. The sites usually require the data to be submitted as structured data and creating the structured data file may be a challenge. At the same time, the aggregator and search sites have a significant amount of offer data already stored as structure data. Trying to match simple vendor descriptions to stored structured data has been a challenge.

Some web sites manually identify attributes to match on for each category, and define a matching between offer and product when the values for all these attributes agree. There are two main limitations of this approach: first, for every category, the vendor needs to manually identify attributes that are important to be matched on. Second, the matcher may have to rely on extracting all the important attributes correctly from the unstructured description of offers, and thus cannot handle missing attributes. In addition, since there is no notion of relative importance between attributes, any mismatched attribute (e.g. Color vs. brand) gets the same penalty.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and apparatus for electronically matching an electronic offer to structured data for a product offering is disclosed. The structure data is reviewed and a dictionary of terms for each attribute from the structure data is created. Attributes in unstructured text may be determined. The unstructured text may be submitted to a parsing system where the parsing system parses the unstructured text. The parsing may occur in variety of ways. In some embodiments, each pair of the attributes (name and value) from the unstructured data and the structured data are obtained, the attribute pairs of the structured data and the unstructured data and compared and a similarity level is calculated for the matching the attribute pairs. The structured data pair that has the highest similarity score to the unstructured data pair is selected and returned.

BRIEF DESCRIPTION OF THE DRAWINGS

FIG. 3 is an illustration of structured data;

FIG. 4*a*-4*c* are illustrations of unstructured data offers; and

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
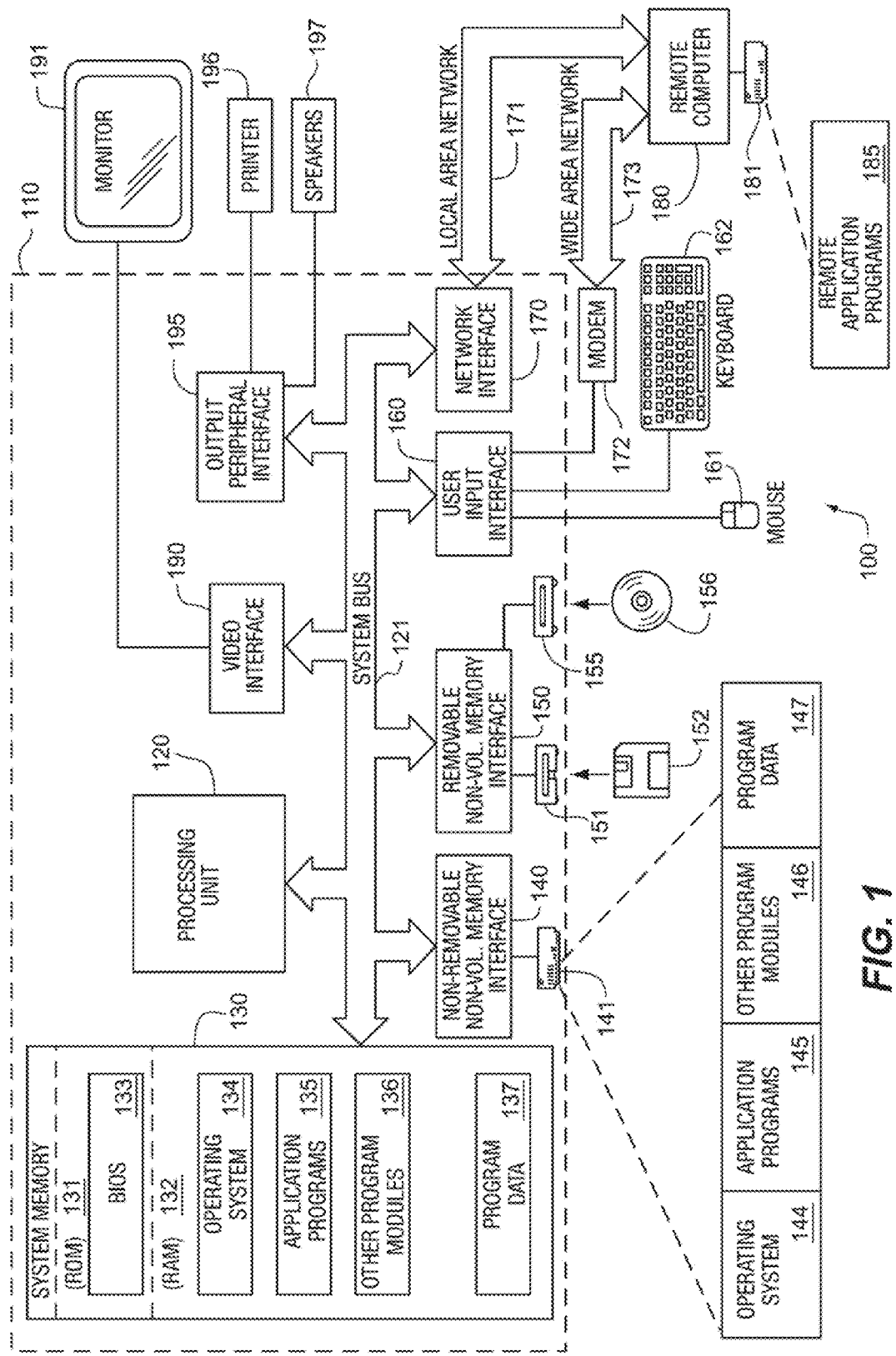
FIG. 1 is an illustration of a computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

Figure 2:
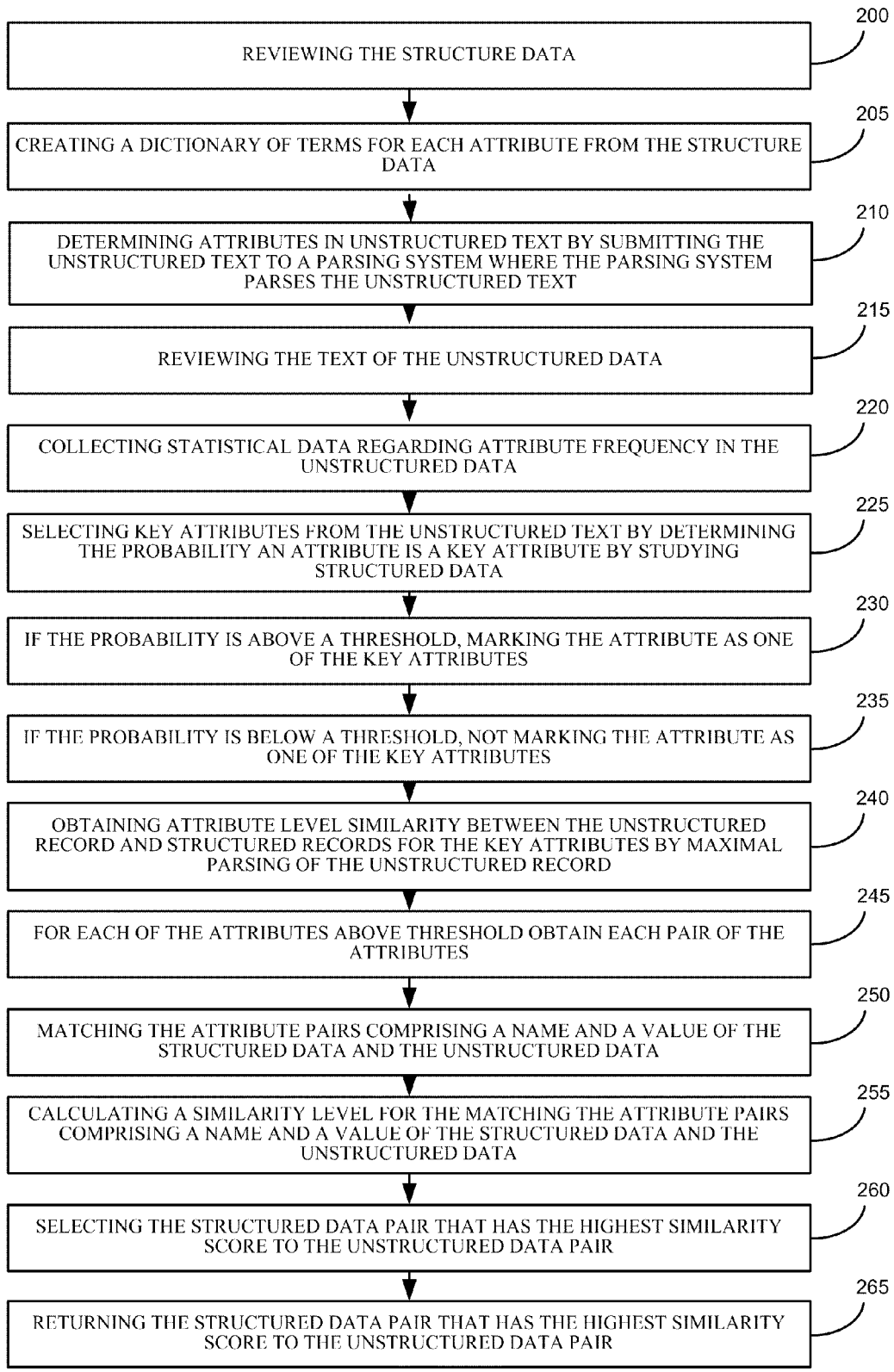
FIG. 2 is an illustration of a method and apparatus for electronically matching an electronic offer to structured data for a product offering.

FIG. 2 is an illustration of a method of receiving unstructured data 400 from a vendor and matching it with stored structure data 300. Structured data 300 may be data that is stored in a database that already has attributes and values. FIG. 3 may be an illustration of structured data 300. Unstructured data 400 may be data that comes from a vendor that describes a product for sale but is not in a structured formant. FIGS. 4a, 4b and 4c may be illustrations of unstructured data 400. In this specific example, FIG. 3 may illustrate a structured record or structured data 300 for Panasonic DMC-FX07 digital camera in the product catalog and FIGS. 4a-4c may be three merchant offers for this product. The structured record 300 may be created from the product specifications provided by a reputed supplier of information on consumer electronic goods and may be added to the category Digital camera by a classifier used for this purpose.

While Offer-1 (FIG. 4a) may be the most detailed, it still may contain only a small part of the information in the structured record 300. The phrase 'Panasonic Lumix' indicates both Brand (Panasonic) as well as Product Line (Panasonic Lumix). Some of the attribute values 305 only match approximately (7.2 megapixel vs. 7 Megapixel, LCD Monitor vs. LCD display). The only attribute name 305 present in the offer is Optical Zoom (it is called Lens System/Optical Zoom in the structured record/data 300). The corresponding values for this attribute 305 may be 3.6×vs. 3.6.

Information provided in Offer-2 (FIG. 4b) may be largely a subset of what is provided in Offer-1. This offer provides the values of Category and Brand but the value of the Model has an extra suffix though, it additionally provides the value of the Color attribute. Offer-3 (FIG. 4c) provides part of the value of the product line (Lumix) and somewhat different value for Sensor Resolution (7.2 MP vs. 7 Megapixel) as well as Model (FX07EB-S vs. DMC-FX07). It neither provides Category nor Brand information. With respect to Offer-3, note further that Panasonic also makes other 7.2 megapixel Lumix digital cameras (e.g. DMC-TZ3K, DMC-LZ6, and DMC-FX12). Moreover, FX07 is also a model number for a Field.

Controller Product.

One possible approach automatically develops semantic understanding of the unstructured text by leveraging structured information in the database, and learns a function for matching previously unseen unstructured text 400 to structured database records 300. This matching function may be defined over a set of automatically selected attributes. It may evaluate the similarity between the semantic inference of unstructured texts and entities, while taking into account both the relative importance of the attributes and the difference between missing values and mismatched values. Only a small number of matched examples may be needed for learning the function.

Training Methodology

Accordingly, at block 200, the structure data may be reviewed. Say there is a database S of entities, represented as structured record/data 300 such as the structured record/data 300 illustrated in FIG. 3. Every structured record/data 300 s∈S may consist of a set of attribute 305<name, value>pairs. An unstructured text u may be received as input, which may be a concise free-text description that specifies values for a subset of the attributes in S in an arbitrary manner such as the illustrations in FIGS. 4a-4c. The values in the text may not precisely match those found in the database of structured offers and it may also contain additional words. An objective may be to match u to one or more structured records 300 in S. The metric of precision and recall may be used for judging the quality of the matching system.

In order to train the matching system, a set U of unstructured textual descriptions may be postulated. The size M of S (correctly matched structured records 300) may be much larger than the size N of U (mismatched unstructured offers 400). Each u∈U may be assumed to have been matched to one structured record 300 in S. Similarly, N mismatched records from S may be assumed to be available, one for every u∈U. The set U may already exist. For example, in an e-commerce catalog scenario, the previously matched offers can yield U. These matches can be obtained when universal codes such as Global Trade Item Numbers (GTINs) are available for both offers and products, otherwise, some labeling effort may need to be expended.

A probabilistic approach may be taken to find the structured record/data 300 s∈S that has the largest probability of matching to the given unstructured text u, a probability that may be denoted by P(match(u; s)). A method for matching may be used that is based on understanding the semantics of the textual features in U, and relating them to the structured attributes in S. This may allow attribute-specific similarities to be measured, and to combine them in a way that may account for the fact that not all attributes are equally important for matching, and that mismatching on important attributes may carry higher penalty for a match than missing an attribute. It is often may be the case that a categorization is defined over the structured records 300 in S. In such cases, use a classifier may be built using well known techniques to categorize the unstructured text and localize the matching to the structured records 300 within that category.

Algorithms

One embodiment of a matching system may have an offline stage, where the structured records 300 may be preprocessed and a machine learning algorithm may be trained that learns to match pairs of structured 300 and unstructured records 400, and an on-line stage where given, a new unstructured record, the best matched structured record(s) 300 may be found using the trained model. In the offline stage, the system may be interested in learning how to match using training data in the form of matched and mismatched pairs of unstructured and structured records 300. The system may discover the subset of attributes that are most important for matching, and their relative importance. For this, the system may need to know the attributes present in unstructured text.

The following may be a sample algorithm for training the method. The training may occur in advance of receiving the offer from the vendor and may be completed offline or at a different location.

---
Algorithm 1 Off-line Training
---

Input:
$\mathcal{U} = \{u_1 \ldots u_N\}$ - a set of unstructured records
$\mathcal{S} = \{s_1 \ldots s_M\}$ - a set of structured records, M >> N
$\mathcal{M} = \{\langle u_i, s_j\rangle_i\}_{i=1}^N$, $(u_i \in \mathcal{U}, s_j \in \mathcal{S})$ - pairs of correctly matched records, one for every $u_i$.
$\mathcal{N} = \{\langle u_i, s_k\rangle_i\}_{i=1}^N$ - similarly, pairs of mismatched records.
Output:
$\mathcal{D}$ - dictionaries,
$\mathcal{K}$ - list of key attributes
w - algorithm parameters
Preprocess:
$\mathcal{D} \Leftarrow$ CreateAttributeDictionaries($\mathcal{S}$) - Construct normalized attribute dictionaries (Sec. 2.2)
Train:
for all u ∈ $\mathcal{U}$ do
   $\hat{u} \Leftarrow$ SemanticParsing(u,$\mathcal{D}$) - Extract putative attributes using semantic passings (Sec. 2.3)
end for
$\mathcal{K} \Leftarrow$ IdentifyKeyAttributes($\{\hat{u}\}$) - (Sec. 2.4)
for all pairs ∈ $\mathcal{M}$ and pairs ∈ $\mathcal{N}$ do
   $f_i^{\mathcal{M}} \Leftarrow$ ExtractSimFeaturs(pair$_i$,$\mathcal{K}$)
   $f_i^{\mathcal{N}} \Leftarrow$ ExtractSimFeaturs(pair$_i$,$\mathcal{K}$) - Construct similarity feature vector for matched and mismatched pairs (Sec. 2.5)
end for
$w \Leftarrow \arg\max_\omega$ LearnToMatch($\mathcal{F}(\omega, f), \{f_i^{\mathcal{M}}\}, \{f_i^{\mathcal{N}}\}, \omega$) - Train a function that maps feature vectors to match probability, $\mathcal{F}(\omega, f) : f \rightarrow [0, 1]$ (Sec. 2.6)
Return: w, $\mathcal{K}$, $\mathcal{D}$ An additional part of the method may also be performed online or in real time when the offer of unstructured data 400 is received from the vendor. The following is one embodiment of a method that may be executed when an offer of unstructured data 400 is received from a vendor.

---
Algorithm 2 Online Matching
---

Input:
u - an unstructured record
$\mathcal{S}, \mathcal{D}, \mathcal{K}$, w
Output: s* - best matching s ∈ $\mathcal{S}$
$\hat{u} \Leftarrow$ SemanticParsing(u,$\mathcal{D}$) - (Sec. 2.3)
for all $s_i \in \mathcal{S}$ do
   $f_i \Leftarrow$ ExtractSimFeaturs($\langle \hat{u}, s_i \rangle, \mathcal{K}$) - (Sec. 2.5)
   P(match($s_i$, u)) $\Leftarrow \mathcal{F}$ (w, $f_i$) - Matching score of a pair (Sec. 2.7)
end for
Return: s* = $\arg\max_{s_i}$ P(match(u, $s_i$)) - Best Matching score of all pairs (Sec. 2.7)

To this end, the system may use an approach for flexible semantic parsing that may leverage the dictionaries from the structured records 300. The system, then, may use the parses to identify the set of key attributes present in unstructured texts, based on their probability of occurrence. Then, for every training data pair of unstructured and structured record/data 300, the system may construct a similarity feature vector representation that measures similarity for every key attribute. The system may use these similarity feature vectors to discover the relative importance of key attributes for matching by learning a scoring function designed to assign high scores to unstructured 400 and structured record-pairs 300 that are correctly matched, and low scores to record-pairs that are mismatched. In the online stage, the system may be given a previously unseen unstructured text and the system may find its best matched structured record/data 300 by applying the semantic parsing module on the input text for the set of key attributes discovered in the offline stage. A similarity feature vector may be extracted for the unstructured record 400 with each structured record 300 and its matching score may be computed using the scoring function learned in the offline stage, choosing the highest scoring structured record 300 as the best match.

Attribute Dictionaries

At block 205, given the database of structured records 300 S, attribute-specific dictionaries of values may be constructed by pooling in, for each attribute, the values it takes across all records. During this construction, standard preprocessing steps may be employed such as unit conversion and name synonymization to ensure that values are brought to a canonical form.

Directional synonyms may also be used. The value of an attribute 305 may be defined to be the directional synonym of another when their equivalence relationship is directional, i.e., when a value has the property of being a subset of another value for some attribute. As an example, consider the category of hard drive products that has an attribute 305 that corresponds to the hard drive interface type. Values of interface types include 'SATA', 'ATA' and 'SCSI'. An interface type value can have other values as its subtypes that allow the main value to be a synonym of its subtype value, and not vice versa. For example, 'SATA-200' and 'SATA-100' are subtypes of 'SATA'. Thus, 'SATA-100' can be replaced by 'SATA' but not vice versa. In general, information about the directionality of synonyms may be maintained when evaluating the equivalence of values in the matching stage.

Semantic Parsing

At block 210, attributes in unstructured text may be determined. The unstructured text may be submitted to a parsing system wherein the parsing system parses the unstructured text. Unstructured records 400 may be segmented into possibly overlapping regions such that some of these regions are associated with one or more attributes. For this, standard tokenization of the unstructured text may be used, and then use the attribute dictionaries from the previous step may be used to associate potential attributes to a subset of the tokens. The association between tokens in the unstructured text to one or more attribute 305 names may be referred to as semantic parsing. A key feature of our parsing is that the association may be highly flexible so that no hard decision is made until the matching step. Instead of committing to a fixed parsing, all possible and potentially overlapping labels for subsets of tokens may be maintained in the unstructured record 400 as unstructured records 400 may be too concise and contain insufficient context information to resolve ambiguities. Making hard decisions prematurely may undermine successful matching.

Figures 5A, 5B:
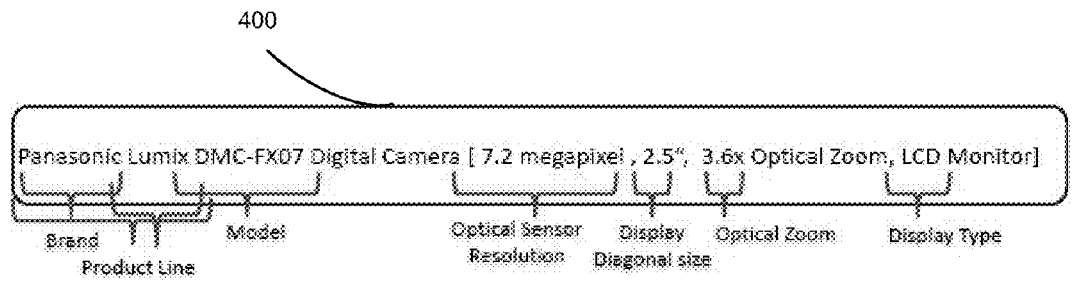
FIG. 5*a*-5*b* are illustrations of parsings of unstructured data offers.

As an example, in FIG. 5(a), the segmented tokens and their respective labeling may be shown for an unstructured text description of a digital camera. 'Panasonic' may be seen as both a Brand and part of Product Line, while both 'Lumix' and 'Panasonic Lumix' have been labeled as valid Product Lines.

Identifying Key attributes

In standard structured to structured record 300 matching where the values of all attributes are provided, it is typically assumed that the set of attributes for each record is the same. In the present formulation, this is not the case, and therefore, akin to feature selection, a small set of attributes may be selected that are important for matching and the small set may be called a subset of attributes or key attributes.

Referring again to FIG. 2, at block 215 the text of the unstructured data 400 may be reviewed and at block 220, statistical data regarding attribute 305 frequency in the unstructured data 400 may be collected. Of course other statistics may be determined from the data and used to establish the attributes.

At block 225, the key attributes may be selected from the unstructured text. In one embodiment, at block 230, the probability an attribute 305 is a key attribute 305 may be determined by studying structured data 300, for example. At block 230, if the probability is above a threshold, marking the attribute 305 as one of the key attributes and at block 235, if the probability is below a threshold, not marking the attribute 305 as one of the key attributes.

Note that it is not expected every unstructured record 400 to have values for all key attributes, but for each to have values for some of them. Hence, after the semantic parsing step, statistics about attributes frequently present in the unstructured data 400 may be collected, and the key attributes may be selected to be the set of attributes K such that each attribute 305 k ∈ K satisfies:

$$\frac{\sum_{u \in U} I[u \cdot val(k) \in \text{values}(k)]}{|U|} \geq \eta \; \forall k \in \kappa,$$

Equation 1 where u:val(k) represent the value of the attribute 305 k for u, [u:val(k)∈values(k)]:=1 if u:val(k) is an valid value of attribute 305 k, and I[z] is an indicator function that evaluates to 1 if z=1 or else to zero. u:val(k) represents the values for the attribute k found in u, [u.val(k)≠0|=TRUE if at least one valid value for attribute k was found in string u, and I[z] is an indicator function that evaluates to 1 if z=TRUE or else to zero. In one experiment, n was picked to =0.6 indicating that each key attribute 305 should be present in 60% of U.

Extracting Similarity Features Between Unstructured and Structured Record Pairs

At this stage, the method may have all possible semantic parsings of the unstructured text records. At block 240, the method may obtain the attribute 305 level similarity between some unstructured record 400 u and structured record 300 s for the key attributes K identified in the previous step. For this, at block 250, the method may obtain for each pair (u, s) the parsing of u (which may be denote by û) (unstructured data 400) that enables obtaining the best agreement between the attribute 305 [name, value] pairs of s (structured data 300) with attribute 305 [name, value] pairs of û. Such a parsing may be referred to as the maximal parsing of u corresponding to s.

Consider FIG. 5(a) which shows an unstructured record 400 that has been parsed in multiple ways during the semantic parsing step. In particular, attribute 305 Product Line has two possible values, 'Lumix' and 'Panasonic Lumix'. In this example, the maximal parsing of u corresponding to product s1 may have only 'Panasonic Lumix' as the product line, and 'Lumix' as Product Line will be discarded. For s2, as it does not have the Product Line specified (missing), either values can be chosen. Given the maximal parsing for a pair [û, s], a similarity feature vector f of length |K| may be created, and its elements may be populated with similarity levels between the maximally-parsed and s for the corresponding key attribute. Here, similarity may be measured based on the type of attributes:

Binary: Attributes whose values need to be matched exactly. Examples of such attributes include brand, product line, etc.

Numeric: Attributes whose values measure numeric quantities. Often these values are fuzzy either because of round-off errors (e.g. 7 MP vs. 7.2 MP) or slightly variant conversion factors (1 GB=1000 MB or 1 GB=1024 MB). Examples of such attributes include capacity, weight etc.

Missing vs. mismatched attribute values

It is often the case that the method may not be able to infer values for some key attribute 305 $k_i$. If the method were to indicate this by a value of 0 in the ith position of the similarity feature vector, f, the method may be treating missing values in the same way as mismatched values. However, the method should not penalize a matching score where either or both of û and s are missing a specific attribute 305 in the same way the method may penalize the score when they disagree on that attribute. In fact, if there is a disagreement on an attribute 305 value, it is a stronger indicator of a mismatch of the pair than if the attribute 305 value is simply missing from either one.

For instance, say that the key attributes for matching on digital cameras are brand, model, product line, optical sensor resolution and display diagonal size. FIG. 5A may show an example of unstructured digital camera record u that has been semantically parsed, and FIG. 5B presents two structured records 300 s1 and s2 from the same category, and the maximal parsing of u with respect to these records. Of the five key attributes for cameras, u has agreement with s1 and with s2 on three attributes. While s2 is missing two key attributes (product line and optical sensor resolution), s1 has a mismatch on model and is missing the optical sensor resolution. Thus, s1 and s2 are different in terms of the attributes they agree on, mismatch on, and are missing with respect to u. This difference between the pairs [u; s1] and [u; s2] should be captured so that during the matching stage, it can be used to score the matches appropriately. This difference between mismatching and missing becomes even more important when the corresponding attributes have differing strength of importance.

At block 255, a similarity level may be calculated for the matching the attribute 305 pairs of the structured data 300 and the unstructured data 400. In one embodiment, the method may therefore define similarity in a way that captures this difference. Let u:val(k) and s:val(k) represent the value of some attribute 305 k for u and s, respectively. The similarity between u and s for attribute 305 k may be defined to be:

$$f_k = \begin{cases} 0 & \text{if } u \cdot val(k) = \emptyset \text{ OR } s \cdot val(k) = \emptyset \\ (-1) & I[|u \cdot val(k) - s \cdot val(k)| > \lambda] \quad \text{otherwise} \end{cases}$$

Equation 2 where I[z] is the indicator function, and λ=0 for binary attribute. In some embodiments, the method may used λ=1 for numeric attributes. Note that the feature similarity becomes 0 when a value is missing, and may be set to −1 when the values are mismatched. Of course, other manners of determining similarity may be possible and are contemplated.

Learning Relative Importance

Instead of treating each key attribute 305 as equally important, the method may learn their relative importance between them using a binary logistic regression of the form:

$$\mathcal{F}(w, f) = P(y = 1 \mid f, w)$$

$$= \frac{1}{1 + \exp\{-(b + f^T w)\}}$$

Equation 3

The logistic regression learns a mapping from the similarity feature vector f to a binary label y, through the logistic function. The parameter w may be the weight vector wherein each component $W_k$ measures the relative importance of the corresponding feature $f_k$ for predicting the label y. The method may have on hand all matched and mismatched training pairs, and let $$f_i = [f_{i1}, f_{i2}, \ldots, f_{iK}]$$

be the feature vector for pair i. Now, let $$\{F;Y\} = \{(f_1, y_1), \ldots, (f_N, Y_N)\}$$

be the set of feature vectors along with their corresponding binary labels. Here, $y_i=1$ indicates that the ith pair is a match, otherwise $y_i=0$. Logistic regression maximizes an objective function which is the conditional log-likelihood of the training data P(Y|F,w):

$$\operatorname*{argmax}_{w} \log P(Y \mid F, w) = \operatorname*{argmax}_{w} \sum_{i=1}^{N} \log P(y_i \mid f_i, w) \qquad \text{Equation 4}$$

where $P(y_i=1|f_i, w)$ is defined by Eq. 3. Note that a feature with positive weight may affect the score by increasing the probability of match for a pair with agreement on the feature, by decreasing the score in the case of a mismatch, and by leaving the score unaffected in the case of a missing value. While Eq. 4 is a convex function with a global optimal solution, the form of the function does not lend itself to an analytical solution, and therefore the method may use the technique proposed in [3].

Matching

During the online phase, the method is given an unstructured text u∈U, and the goal is to identify its best matching structured record 300 s∈S. The scoring function learned during the offline phase (Eq. 3) may provide the probability of match for a pair [u, s]. Hence, the method may find the best match by pairing u with every s∈S, calculating their match score, and picking the s* that results in the highest score. For practical implementation, instead of actually pairing u with every s∈S, the method leverages on efficient inverted indices on the attribute 305 values to obtain a putative (usually small) subset of S that are likely to be a match. Then, the method finds the best match within this subset using the method described in the previous paragraph. Efficient indexing schemes (in the context of record linkage) may also be used and exploited in our framework. At block 260, the structure data that has the highest similarity score to the unstructured data 400 pair may be selected and at block 265, the structured data 300 pair that has the highest similarity score to the unstructured data 400 pair may be returned.

Exploiting Domain Knowledge

Often, it may be the case that the method may have domain knowledge about certain attributes that can be leveraged to learn a better matching function. In this section, an example of such an attribute 305 is presented that is common in e-commerce settings. In particular, a large number of commercial products have the model attribute. However, models are specified in un-structured text in varied ways which would be difficult to learn using reasonably sized training data. A scoring function is designed that captures the nuances of model variations based on the following:

1. Most models exhibit a left-to-right order of importance of the characters in their strings.
2. Some models begin with a standard prefix that is associated with a particular manufacturer. For example, all Panasonic digital cameras models start with 'DMC'. Many merchants may not provide this prefix in their unstructured textual description of products and therefore absence of such prefixes need not be penalized as much as, say, missing the model number.
3. Mismatching or missing numbers is a stronger indication of a mismatch than mismatching or missing post-fix letters. For instance 'DMC-FX07-K' and 'DMC-FX07-S' are likely different colors (less important variation) of the same model, whereas 'DMC-FX05' and 'DMC-FX07' are likely two different models. Similarly, 'DMC-FX2EB' is most likely a type of 'DMC-FX07' while 'DMC-FX15' is a model different from 'DMC-FX150'. Keeping these properties of how a model number is specified in mind, the method may define a scoring function $\text{score}_{model}$ that assigns similarity in the range [0,1] between two models u.val(model) and s.val(model). The function may be inspired by the edit-distance score but in addition has facility for controlling the importance of missing characters as opposed to mismatched ones, and discriminating between missing prefix and postfix penalties:

$$\text{score}_{model} = \frac{x}{x + \alpha y + \beta z + \gamma t} \qquad \text{Equation 5}$$

Here, x is the size of the string consisting of consecutively matched characters. Next, y is the number of missing prefix characters, z is the number of missing postfix characters and t is the number of mismatched characters such that x+y+z+t=|u:val(model)|, the length of u:val(model). The model first computes best local alignment between u:val(model) and s:val(model). If s:val(model) is shorter than u:val(model), the unaccounted for characters in u:val(model) are considered missing.

The method may wish to differentiate between mismatches beginning with a mismatched letter and mismatches beginning with a mismatched number, or missing letters and numbers and hence use specific $\alpha_1, \alpha_2, \beta_1, \beta_2, \gamma_1, \gamma_2$ where the subscript 1 is for the number case, and 2 for the letter case. In this work, a tuning set may be used to learn $\{\alpha_1, \alpha_2, \beta_1, \gamma_1, \gamma_2\} := \{1:5; 0:5; 1; 8; 3\}$ for our application. The method may also perform sensitivity analysis to ensure that the performance is not sensitive to these values. From the parameter setting, it may be seen that missing characters in a model carry less penalty than mismatched characters $(\gamma_i > \beta_i, \gamma_i > \alpha_j, \forall_{i,j})$.

Performance Metric

For evaluation purpose, a set of unstructured offers u∈U may be provided. Assume that an oracle can provide, for each u, correctly matched structured product $S_u$. The matcher will have no knowledge about $S_u$, but instead predict the best matched product $S^*_u$ with probabilistic score $\eta_{u,s}{}^*_u$, as defined by Eq. 3. Note that by best matched, the method may determine that there is no other s that can match u with a higher score. Thus, the method may be evaluating performance on the harder task of the matcher finding the best matching product for every unstructured offer u.

Define θ∈[0, 1] to be the threshold on the probability output by the scoring function defined in Equation. 3. Precision and recall at threshold level θ may be defined as:

$$\text{Precision}(\theta) = \frac{\sum_{u \in U} I[\eta_{u,s^*_u} > \theta] \text{ AND } I[s^*_u = s_u])}{\sum_{u \in U} I[\eta_{u,s^*_u} > \theta]} \qquad \text{Equation 6}$$

-continued $$Recall(\theta) = \frac{\sum_{u \in U} I[\eta_{u,s_u^*} > \theta] \text{ AND } [s_u^* = s_u]}{|C|} \quad \text{Equation 7}$$

where I[z] is the indicator function with values {0, 1}.

Data set for training and testing

As another example, the method considered three categories from an online catalog: Digital cameras, LCD TVs and Ovens. These categories were selected as the products in these categories have different types of attributes and the characteristics of the offers are also different. In the Digital camera category, there were 3,019 products and 2,845 offers while these numbers for LCD TVs and Ovens were (4,574 and 1,386) and (6,852 and 3,954), respectively. The offers were hand-matched to the corresponding products providing the method with a truth set for evaluation.

Training set: For each category, the method may sample 10% of the offers along with their matchings to the products to be used as training set. This act as the positive (matched) examples for training. A set of negative examples may also be created by pairing products that are not matched with offers.

Test set: The remaining 90% of the matched pairs may be used for computing performance metrics. At test time, the matcher without any knowledge of the true match, returns the most confidently matched structured record 300 for each offer u. This is compared against the known true match to evaluate precision and recall.

In conclusion, the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The invention claimed is:

1. A computer based method of electronically matching an electronic offer to structured data comprising a product offering comprising:
    reviewing the structured data;
    creating a dictionary of terms for each attribute from the structured data;
    determining attributes in unstructured text comprising
        submitting the unstructured text to a parsing system wherein the parsing system parses the unstructured text comprising:
        reviewing the text of the unstructured data;
        collecting statistical data regarding attribute frequency in the unstructured data;
        selecting key attributes from the unstructured text comprising
            determining the probability an attribute is a key attribute by studying structured data;
            if the probability is above a threshold, marking the attribute as one of the key attributes;
            if the probability is below a threshold, not marking the attribute as one of the key attributes;
        obtaining attribute level similarity between the unstructured record and structured records for the key attributes comprising;
        maximal parsing the unstructured record comprising for each of the attributes above threshold
            obtain each pair of the attribute from the unstructured data and the structured data;
    matching the attribute pairs comprising a name and a value of the structured data and the unstructured data;
    calculating a similarity level for the matching the attribute pairs comprising a name and a value of the structured data and the unstructured data
    selecting the structured data pair that has the highest similarity score to the unstructured data pair; and
    returning the structured data pair that has the highest similarity score to the unstructured data pair.

2. The method of claim 1, wherein calculating a similarity level further comprising creating a similarity feature vector f length K and populate its elements with similarity levels between the maximum unstructured record and s for the corresponding K (key attribute) based on attribute type to enable the maximum agreement between the attribute pairs of structured data and the attribute pairs of unstructured data.

3. The method of claim 1, wherein if the attribute type is binary, requiring an exact match and if the attribute type is numeric, requiring a best match.

4. The method of claim 1, further comprising training the system with unstructured and structured pairs which are known to be matched and known to be mismatched.

5. The method of claim 1, further comprising segmenting the unstructured records into regions wherein the regions may overlap.

6. The method of claim 1, wherein segmenting the unstructured records into regions wherein the regions may overlap further comprises:
    adding tokens to the unstructured text; and
    using the dictionary to associate potential attributes to a subset of the tokens.

7. The method of claim 6, wherein the dictionary is directional.

8. The method of claim 1, wherein matches with longer character match runs between unstructured data structured data values and are given more weight than attribute matches with shorter run matches between unstructured data structured data values.

9. A computer based method of matching a text description to a structured record of a product, the method comprising:
    obtaining a set of text descriptions and a set of structured records individually containing a plurality of attributes of a product, each of the text descriptions matching one of the structured records;
    parsing the set of text descriptions to form one or more text segments;
    associating the text segments of each text description with one or more attributes of the structured records; and
    deriving a weight factor for at least some of the associated attributes based on matches of the individual text descriptions to one of the structured records, the weight factor representing a relative importance of the corresponding attributes for matching.

10. The method of claim 9 wherein parsing the text descriptions includes parsing each of the text descriptions into a plurality of text segments, at least two of the text segments overlapping each other.

11. The method of claim 9 wherein associating each of the text segments includes associating each of the text segments with more than one of the attributes.

12. The method of claim 9 wherein each of the attributes is associated with a corresponding value, and wherein:
    parsing the text descriptions includes parsing each of the text descriptions into a plurality of text segments, at least two of the text segments overlapping each other;

associating each of the text segments includes associating each of the text segments with more than one of the attributes; and the method further includes, for each of the text description, selecting one attribute from the more than one associated attributes as an associated attribute for the text description based on the values of the more than one attributes in the text description and in the structured record.

13. The method of claim 9 wherein each of the attributes is associated with a corresponding value, and wherein:

parsing the text descriptions includes parsing each of the text descriptions into a plurality of text segments, at least two of the text segments overlapping each other;

associating each of the text segments includes associating each of the text segments with more than one of the attributes; and the method further includes, for each of the text descriptions, selecting one attribute from the more than one attributes associated with each of the text segments such that the values of the selected attribute in the text description maximally match those in the corresponding structured record.

14. The method of claim 9, further comprising:

determining a frequency of occurrence of at least one of the attributes in the attributes associated with the text segments; and if the determined frequency of occurrence is above a threshold, marking the at least one attribute as a key attribute.

15. The method of claim 9, further comprising:

determining a frequency of occurrence of at least one of the attributes in the attributes associated with the text segments;

if the determined frequency of occurrence is above a threshold, marking the at least one attribute as a key attribute; and wherein associating each of the text segments includes associating each of the text segments with at least one of the key attributes.

16. The method of claim 9 wherein each of the attributes is associated with a corresponding value, and wherein deriving a weight factor includes:

generating a similarity vector having one or more elements individually representing a similarity of the values of attributes in the text descriptions and those in the corresponding structured records; and deriving the weight factors of the attributes based at least in part on a binary logistic regression of the similarity vector.

17. The method of claim 9 wherein each of the attributes is associated with a corresponding value, and wherein deriving a weight factor includes:

generating a similarity vector having one or more elements individually representing a similarity of the values of attributes in the text descriptions and those in the corresponding structured records, wherein the one or more elements have binary values or numeric values; and deriving the weight factors of the attributes based at least in part on a binary logistic regression of the similarity vector.

18. A computer based method of matching a text description to one of a set of structured records of products in a database, the structured records individually having a plurality of attributes associated with corresponding values, the method comprising:

parsing a text description related to a product into a plurality of text segments;

for each of at least some of the structured records in the database, individually associating the text segments with one of the attributes of the structured record;

generating a similarity vector having one or more elements individually representing a similarity of the values of attributes in the text description and those in the corresponding structured record;

calculating a probability of match between the text description and the structured record based on the generated similarity vector; and selecting one of the structured record as a match for the text description based on the calculated probabilities.

19. The method of claim 18 wherein calculating the probability includes calculating a probability of match between the text description and the structured record based on both the generated similarity vector and weight factors associated with each of the attributes, the weight factors individually representing a relative importance of the corresponding attributes for matching.

20. The method of claim 18, further comprising:

generating a subset of the structured records as candidate records using inverted indices of the attributes, wherein for each of at least some of the structured records in the database includes:

for each of the subset of the structured records in the database, individually associating the text segments with one of the attributes of the product corresponding to the structured record;

generating a similarity vector having one or more elements individually representing a similarity of the values of corresponding attributes in the text description and in the structured record; and calculating a probability of match between the text description and the structured record based on the generated similarity vector.

* * * * *